US012670056B2

(12) United States Patent
Zeng et al.

(10) Patent No.: US 12,670,056 B2
(45) Date of Patent: Jun. 30, 2026

(54) MEMORY MANAGEMENT METHOD AND MODULE, CHIP, ELECTRONIC DEVICE, AND STORAGE MEDIUM

(71) Applicant: AMLOGIC (SHANGHAI) CO., LTD., Shanghai (CN)

(72) Inventors: Tao Zeng, Shanghai (CN); Jianxin Pan, Shanghai (CN)

(73) Assignee: AMLOGIC (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 18/995,732

(22) PCT Filed: Aug. 30, 2022

(86) PCT No.: PCT/CN2022/115945
§ 371 (c)(1),
(2) Date: Jan. 16, 2025

(87) PCT Pub. No.: WO2024/044986
PCT Pub. Date: Mar. 7, 2024

(65) Prior Publication Data
US 2026/0037356 A1 Feb. 5, 2026

(51) Int. Cl.
*G06F 11/00* (2006.01)
*G06F 11/07* (2006.01)
*G06F 12/1009* (2016.01)

(52) U.S. Cl.
CPC ...... *G06F 11/0772* (2013.01); *G06F 11/0793* (2013.01); *G06F 12/1009* (2013.01); *G06F 2212/401* (2013.01)

(58) Field of Classification Search
CPC ............. G06F 11/0772; G06F 11/0793; G06F 12/1009
See application file for complete search history.

(56) References Cited

U.S. PATENT DOCUMENTS 9,779,023 B1 10/2017 Armangau et al.
11,656,985 B2 * 5/2023 Stabrawa .............. G06F 9/5016
711/173

(Continued)

FOREIGN PATENT DOCUMENTS

CN 101231619 A 7/2008
CN 103902467 A 7/2014

(Continued)

OTHER PUBLICATIONS

International Search Report received in International Application No. PCT/CN2022/115945, mailed Mar. 22, 2023.

*Primary Examiner* — Jonathan D Gibson
(74) *Attorney, Agent, or Firm* — Knobbe, Martens, Olson & Bear, LLP

(57) ABSTRACT

A memory management method and module, a chip, an electronic device, and a storage medium. The memory management method comprises: scanning memory pages to which virtual addresses of a discontinuous memory mapping space are mapped to acquire a compressible memory page as a first memory page; compressing memory data in the first memory page to acquire corresponding memory compressed data; storing the memory compressed data in a data storage module, the data storage module being located in memory space outside the discontinuous memory mapping space; after storing the memory compressed data in the data storage module, releasing the first memory page; and setting the corresponding virtual address as a page fault address. The memory utilization is improved.

20 Claims, 3 Drawing Sheets

(56)     References Cited

U.S. PATENT DOCUMENTS

| | | | | |
|---|---|---|---|---|
| 2007/0168642 A1* | 7/2007 | Wilson | G06F 12/08 | |
| | | | 711/206 | |
| 2011/0161619 A1* | 6/2011 | Kaminski | G06F 12/1027 | |
| | | | 711/E12.016 | |
| 2013/0212077 A1* | 8/2013 | Chai | H04L 67/06 | |
| | | | 707/693 | |
| 2015/0212839 A1* | 7/2015 | Tsirkin | G06F 9/45558 | |
| | | | 711/161 | |
| 2019/0250837 A1* | 8/2019 | Stabrawa | G06F 3/067 | |
| 2020/0089616 A1* | 3/2020 | Geng | G06F 9/44573 | |
| 2021/0141548 A1* | 5/2021 | Stabrawa | G06F 3/067 | |
| 2022/0197793 A1* | 6/2022 | Shanbhogue | H03M 7/60 | |
| 2023/0103447 A1* | 4/2023 | Subramoney | G06F 9/4406 | |
| | | | 718/1 | |
| 2023/0229598 A1* | 7/2023 | Ryu | G06F 12/1009 | |
| | | | 711/202 | |
| 2025/0053521 A1* | 2/2025 | Erickson | G06F 13/4282 | |
| 2026/0037356 A1* | 2/2026 | Zeng | G06F 11/0772 | |

FOREIGN PATENT DOCUMENTS

| | | | |
|---|---|---|---|
| CN | 111352861 A | 6/2020 | |
| CN | 114116191 A | 3/2022 | |

* cited by examiner

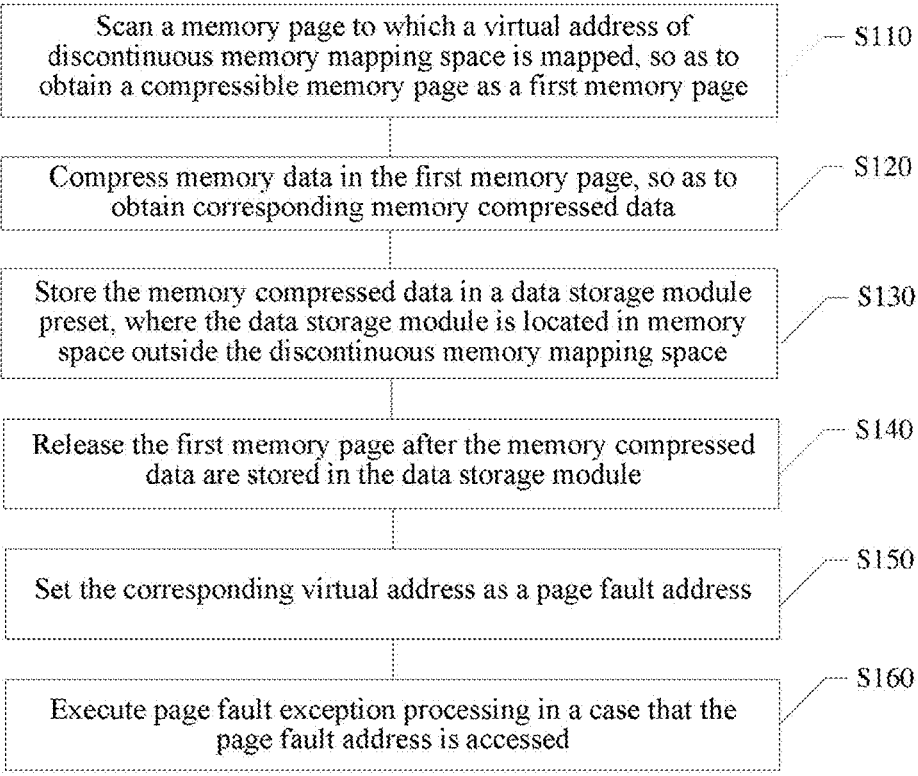

Scan a memory page to which a virtual address of discontinuous memory mapping space is mapped, so as to obtain a compressible memory page as a first memory page — S110

Compress memory data in the first memory page, so as to obtain corresponding memory compressed data — S120

Store the memory compressed data in a data storage module preset, where the data storage module is located in memory space outside the discontinuous memory mapping space — S130

Release the first memory page after the memory compressed data are stored in the data storage module — S140

Set the corresponding virtual address as a page fault address — S150

Execute page fault exception processing in a case that the page fault address is accessed — S160

FIG. 1

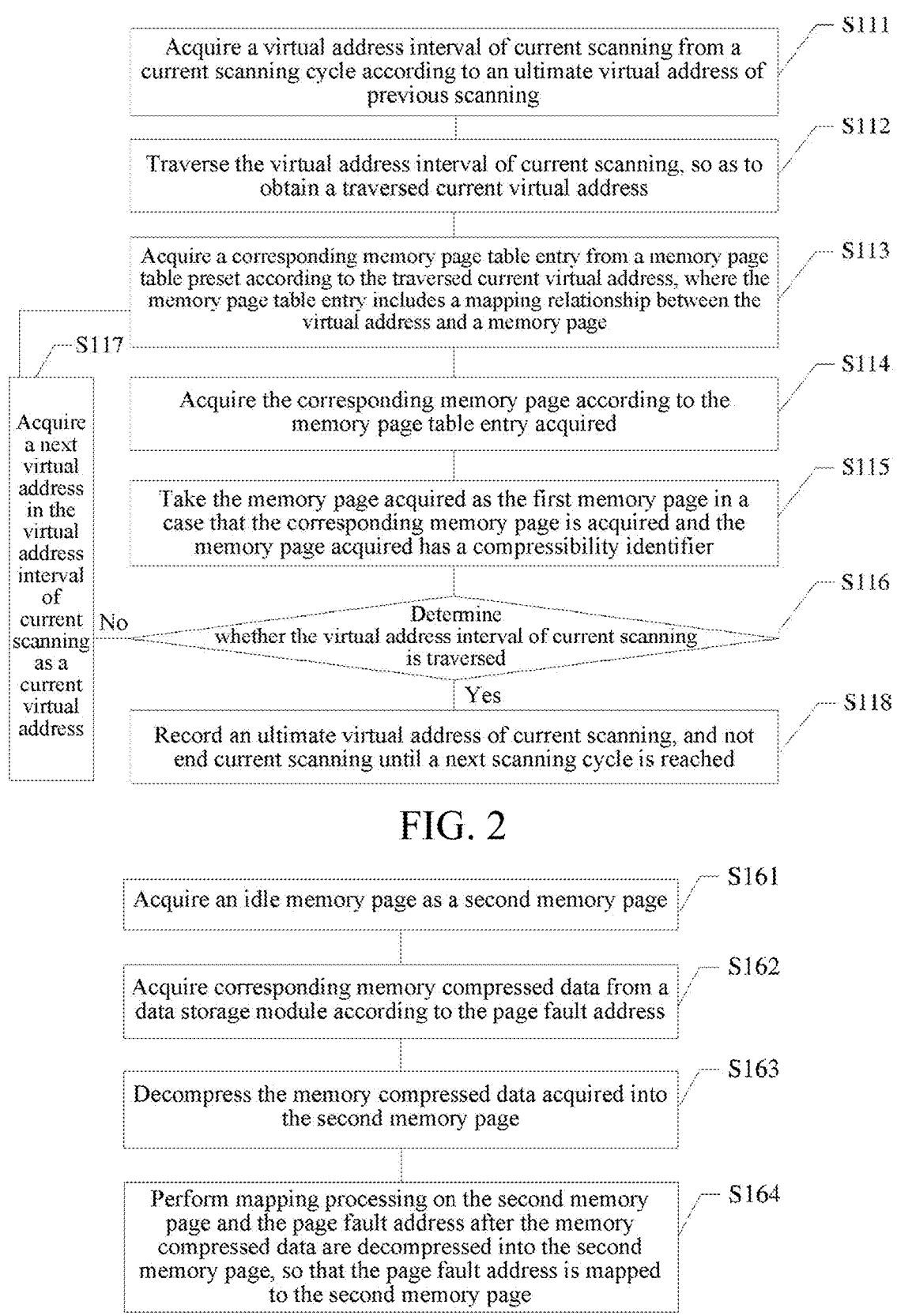

S111

Acquire a virtual address interval of current scanning from a current scanning cycle according to an ultimate virtual address of previous scanning

S112

Traverse the virtual address interval of current scanning, so as to obtain a traversed current virtual address

S113

Acquire a corresponding memory page table entry from a memory page table preset according to the traversed current virtual address, where the memory page table entry includes a mapping relationship between the virtual address and a memory page

S117

Acquire a next virtual address in the virtual address interval of current scanning as a current virtual address

S114

Acquire the corresponding memory page according to the memory page table entry acquired

S115

Take the memory page acquired as the first memory page in a case that the corresponding memory page is acquired and the memory page acquired has a compressibility identifier

S116

No

Determine whether the virtual address interval of current scanning is traversed

Yes

S118

Record an ultimate virtual address of current scanning, and not end current scanning until a next scanning cycle is reached

Acquire an idle memory page as a second memory page

S162

Acquire corresponding memory compressed data from a data storage module according to the page fault address

S163

Decompress the memory compressed data acquired into the second memory page

S164

Perform mapping processing on the second memory page and the page fault address after the memory compressed data are decompressed into the second memory page, so that the page fault address is mapped to the second memory page

FIG. 3

MEMORY MANAGEMENT METHOD AND MODULE, CHIP, ELECTRONIC DEVICE, AND STORAGE MEDIUM

TECHNICAL FIELD

The disclosure relates to the field of computers, and in particular to a memory management method and module, a chip, an electronic device, and a storage medium.

BACKGROUND

As an essential member of a computer, a memory is also referred to as a main memory and serves as a bridge between a central processing unit (CPU) and a magnetic disk/tape, etc. During program running, an operating system first needs to load data and programs to be run into the memory, and then transfer them from the memory into the central processing unit. If the data to be accessed by the central processing unit are not found in the memory, page-fault interruption will be triggered automatically. The data will then be loaded into the memory by a hardware device of the operating system and a memory management component in response to the interruption.

Discontinuous memory mapping space (Vmalloc) is dynamic memory space that is continuous on virtual addresses and discontinuous on physical addresses. In the discontinuous memory mapping space, each virtual address is mapped to a physical memory page.

However, an existing discontinuous memory mapping space is insufficiently utilized, leading to a waste of memory resources.

SUMMARY

Technical Problem

To improve memory utilization, the problem to be solved by the disclosure is to provide a memory management method and module, a chip, an electronic device, and a storage medium.

Technical Solution

To solve the above problem, a memory management method is provided in embodiments of the disclosure. The method includes:

scanning a memory page to which a virtual address of a discontinuous memory mapping space is mapped, so as to obtain a compressible memory page as a first memory page;

compressing memory data in the first memory page, so as to obtain corresponding memory compressed data;

storing the memory compressed data in a data storage module, where the data storage module is located in memory space outside the discontinuous memory mapping space;

releasing the first memory page after the memory compressed data are stored in the data storage module; and setting the corresponding virtual address as a page fault address.

Optionally, the scanning a memory page to which a virtual address of a discontinuous memory mapping space is mapped, so as to obtain a compressible memory page as a first memory page includes:

acquiring a virtual address interval of current scanning from a current scanning cycle according to an ultimate virtual address of previous scanning;

traversing the virtual address interval of current scanning, so as to obtain a traversed current virtual address;

acquiring a corresponding memory page table entry from a memory page table according to the traversed current virtual address, where the memory page table entry includes a mapping relationship between the virtual address and a memory page;

acquiring the corresponding memory page according to the memory page table entry acquired;

taking the memory page acquired as the first memory page in a case that the corresponding memory page is acquired and the memory page acquired has a compressibility identifier;

acquiring a next virtual address as a current virtual address, and not re-executing steps from the step of acquiring a corresponding memory page table entry according to the traversed current virtual address until all virtual address intervals of current scanning are traversed; and recording an ultimate virtual address of current scanning, and not ending current scanning until a next scanning cycle is reached.

Optionally, the acquiring a virtual address interval of current scanning according to an ultimate virtual address of previous scanning includes:

acquiring the ultimate virtual address of previous scanning;

acquiring a data structure instance of a virtual mapping area corresponding to current scanning according to the ultimate virtual address of previous scanning;

acquiring an initial virtual address of current scanning and information of a size of the virtual address interval from the data structure instance of the virtual mapping area corresponding to current scanning;

calculating the ultimate virtual address of current scanning according to the initial virtual address of current scanning and the information of the size of the virtual address interval that are acquired; and forming the virtual address interval of current scanning from the initial virtual address of current scanning to the ultimate virtual address of current scanning.

Optionally, the storing the memory compressed data in a data storage module includes:

allocating a corresponding data storage position to the memory compressed data in the data storage module in a case that compression of the memory compressed data succeeds and a compression ratio satisfies a preset demand; and storing the memory compressed data in the data storage position allocated in the data storage module.

Optionally, after the corresponding virtual address is set as the page fault address, the method further includes:

executing page fault exception processing in a case that the page fault address is accessed.

Optionally, the executing page fault exception processing includes:

acquiring an idle memory page as a second memory page;

acquiring the corresponding memory compressed data from the data storage module according to the page fault address;

decompressing the memory compressed data acquired into the second memory page; and performing mapping processing on the second memory page and the page fault address, so that the page fault address is mapped to the second memory page.

Optionally, before page fault exception processing is executed, the method further includes: pre-applying for the idle memory page; and storing information of the idle memory page applied for; and the acquiring an idle memory page as a second memory page includes: acquiring the idle memory page applied for as the second memory page according to the stored information of the idle memory page.

Optionally, after the information of the idle memory page applied for is stored, the method further includes: performing locking processing on the idle memory page applied for, so that the idle memory page applied for is locked; and before the memory compressed data acquired are decompressed into the second memory page, the method further includes: performing unlocking processing on the idle memory page applied for, so that a lock of the idle memory page applied for is removed.

Optionally, after the memory compressed data are stored in the data storage module, the method further includes: generating a corresponding page mapping data structure instance for the memory compressed data, where the page mapping data structure instance includes the page fault address and information of the storage position of the memory compressed data in the data storage module; and inserting the page mapping data structure instance generated into a management red-black tree with the page fault address as a key value; and the acquiring the corresponding memory compressed data from the data storage module according to the page fault address includes: acquiring the corresponding page mapping data structure instance from the management red-black tree according to the page fault address; acquiring the information of the storage position of the memory compressed data in the data storage module from the page mapping data structure instance acquired in a case that the corresponding page mapping data structure instance is acquired; acquiring the memory compressed data from the data storage position acquired; and releasing the corresponding page mapping data structure instance after the memory compressed data are acquired from the data storage position acquired.

Optionally, the data storage module is a zero-capacitor random access memory (ZRAM) module.

Correspondingly, a memory management module is further provided in the embodiments of the disclosure. The memory management module includes:

a scanning component configured to scan a memory page to which a virtual address of a discontinuous memory mapping space is mapped, so as to obtain a compressible memory page as a first memory page;

a compression component configured to compress memory data in the first memory page, so as to obtain corresponding memory compressed data;

a storage component configured to store the memory compressed data in a data storage module, where the data storage module is located in memory space outside the discontinuous memory mapping space;

a memory page release component configured to release the first memory page after the memory compressed data are stored in the data storage module; and a page fault address setting component configured to set the corresponding virtual address as a page fault address.

Correspondingly, a chip is further provided in the embodiments of the disclosure. The above memory management module is integrated into the chip.

Correspondingly, an electronic device is further provided in the embodiments of the disclosure. The electronic device includes at least one memory and at least one processor, where the memory stores one or more computer instructions, and the one or more computer instructions are executed by the processor, so as to implement any memory management method described above.

Correspondingly, a storage medium is further provided in the embodiments of the disclosure. The storage medium stores one or more computer instructions, where the one or more computer instructions are configured to implement any memory management method described above.

Beneficial Effects

Compared with the prior art, the technical solutions of the disclosure have the advantages as follows: In the memory management method according to the embodiments of the disclosure, the discontinuous memory mapping space can be shrunk by compressing the compressible first memory page in the discontinuous memory mapping space, avoiding a waste of memory resources caused by long-term occupation of the compressible first memory page, and improving memory utilization correspondingly.

BRIEF DESCRIPTION OF THE DRAWINGS

FIG. 1 is a schematic flowchart of an embodiment of a memory management method according to the technical solution of the disclosure.

FIG. 2 is a schematic flowchart of scanning a memory page to which a virtual address of a discontinuous memory mapping space is mapped, so as to obtain a compressible memory page as a first memory page in an embodiment of a memory management method according to the technical solution of the disclosure.

FIG. 3 is a schematic flowchart of executing page fault exception processing in an embodiment of a memory management method according to the technical solution of the disclosure.

DETAILED DESCRIPTION

Figure 4:
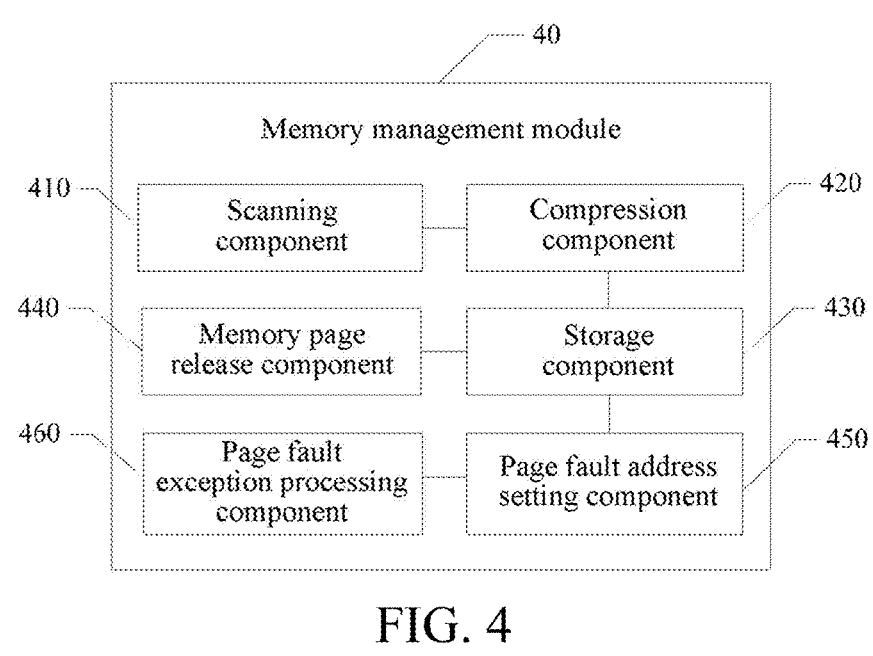
FIG. 4 is a schematic structural diagram of an embodiment of a memory management module according to the technical solution of the disclosure.

It can be seen from the background art that existing discontinuous memory mapping space is utilized insufficiently.

Specifically, in the discontinuous memory mapping space, each virtual address is mapped to a memory page. In consideration of performance, the discontinuous memory mapping space applied by drivers, modules, and kernels reside in a memory during running. In consequence, a waste of memory resources is generated because some virtual address space in the discontinuous memory mapping space is neither released nor accessed for a long time.

A memory management method is provided in embodiments of the disclosure. The method includes: a memory page to which a virtual address of a discontinuous memory mapping space is mapped is scanned, so as to obtain a compressible memory page as a first memory page; memory data in the first memory page are compressed, so as to obtain corresponding memory compressed data; the memory compressed data are stored in a data storage module, where the data storage module is located outside the discontinuous memory mapping space; the first memory page is released after the memory compressed data are stored in the data storage module; and the corresponding virtual address is set as a page fault address.

It can be seen that the discontinuous memory mapping space can be shrunk by compressing the compressible first memory page in the discontinuous memory mapping space, avoiding a waste of memory resources caused by long-term occupation of the compressible first memory page, and improving memory utilization correspondingly.

To make the above objectives, features, and advantages of the disclosure more apparent and understandable, specific embodiments of the disclosure are described in detail below with reference to the accompanying drawings.

FIG. 1 is a schematic flowchart of an embodiment of a memory management method according to the technical solution of the disclosure. With reference to FIG. 1, the memory management method may specifically include:

S110: A memory page to which a virtual address of a discontinuous memory mapping space is mapped is scanned, so as to obtain a compressible memory page as a first memory page.

S120: Memory data in the first memory page are compressed, so as to obtain corresponding memory compressed data.

S130: The memory compressed data are stored in a data storage module preset, where the data storage module is located in memory space outside the discontinuous memory mapping space.

S140: The first memory page is released after the memory compressed data are stored in the data storage module.

S150: The corresponding virtual address is set as a page fault address.

In the embodiment, after the corresponding virtual address is set as the page fault address, the memory management method further includes:

S160: Page fault exception processing is executed in a case that the page fault address is accessed.

With reference to FIG. 1 continuously, S110 that a memory page to which a virtual address of a discontinuous memory mapping space is mapped is scanned, so as to obtain a compressible memory page as a first memory page is executed.

The memory page to which the virtual address of the discontinuous memory mapping space is mapped is scanned, so as to obtain the compressible memory page as the first memory page, which is prepared for compressing the memory data in the first memory page subsequently.

FIG. 2 is a schematic flowchart of scanning a memory page to which a virtual address of a discontinuous memory mapping space is mapped, so as to obtain a compressible memory page as a first memory page in an embodiment of a memory management method according to the technical solution of the disclosure. With reference to FIG. 2, the step that a memory page to which a virtual address of a discontinuous memory mapping space is mapped is scanned, so as to obtain a compressible memory page as a first memory page includes:

S111, a virtual address interval of current scanning is acquired from a current scanning cycle according to an ultimate virtual address of previous scanning.

In the embodiment, a corresponding data structure instance of a virtual mapping area (vmap_area) is created for the virtual address interval in a case that the virtual address interval is mapped to the memory page in the discontinuous memory mapping space. The data structure instance of the virtual mapping area is a basic data structure for managing the discontinuous memory mapping space, and includes an initial virtual address mapped to the memory page and information a size of the virtual address interval. Thus, the memory page to which the virtual address of the discontinuous memory mapping space is mapped can be scanned by scanning the data structure instance of the virtual mapping area.

Specifically, the step that a virtual address interval of current scanning is acquired according to an ultimate virtual address of previous scanning includes: the ultimate virtual address of previous scanning is acquired; a data structure instance of a virtual mapping area corresponding to current scanning is acquired according to the ultimate virtual address of previous scanning; an initial virtual address of current scanning and information of a size of the virtual address interval are acquired from the data structure instance of the virtual mapping area corresponding to current scanning; an ultimate virtual address of current scanning is calculated according to the initial virtual address of current scanning and the information of the size of the virtual address interval that are acquired; and the virtual address interval of current scanning is formed from the initial virtual address of current scanning to the ultimate virtual address of current scanning.

In the embodiment, to facilitate scanning of the discontinuous memory mapping space, scanning information of the memory page to which the virtual address of the discontinuous memory mapping space is mapped is recorded by a data structure of a discontinuous memory mapping space shrinker (vmalloc_shrinker).

Specifically, the data structure of the discontinuous memory mapping space shrinker includes: a last_vaddr field configured to record information of the ultimate virtual address of the discontinuous memory mapping space of previous scanning; and a scanned_pages field configured to record information of a number of scanned memory pages.

Correspondingly, the information of the ultimate virtual address of the discontinuous memory mapping space of previous scanning is acquired by reading the last_vaddr field in the data structure of the discontinuous memory mapping space shrinker.

In the embodiment, the data structure instance of the virtual mapping area corresponding to current scanning is acquired according to the ultimate virtual address of previous scanning. In other words, the data structure instance of the virtual mapping area corresponding to the virtual address interval of previous scanning is acquired according to the ultimate virtual address of previous scanning. A preset red-black tree is queried through the data structure instance of the virtual mapping area corresponding to the virtual address interval of previous scanning, so as to obtain the data structure instance of the virtual mapping area corresponding to the virtual address interval of current scanning.

The virtual address intervals recorded in each data structure instance of the virtual mapping area are continuous virtual address intervals. Thus, when the initial virtual address and the information of the size of the virtual address interval that are recorded in the data structure instance of the virtual mapping area corresponding to current scanning are acquired, the ultimate virtual address of current scanning can be acquired by summing the initial virtual address of current scanning and the size of the virtual address interval.

S112, the virtual address interval of current scanning is traversed, so as to obtain a traversed current virtual address.

In the embodiment, after the virtual address interval of current scanning is acquired, all virtual addresses in the virtual address interval of current scanning are traversed in sequence from the initial virtual address of current scanning.

S113, a corresponding memory page table entry is acquired from a memory page table according to the traversed current virtual address, where the memory page table entry includes a mapping relationship between the current virtual address and a memory page.

In the discontinuous memory mapping space, in a case that the traversed current virtual address is mapped to the memory page, the mapping relationship between the current virtual address and the memory page is recorded in the page table entry of the memory page table. Thus, by querying the corresponding page table entry in the memory page table, the mapping relationship between the traversed current virtual address and the memory page can be acquired.

S114, the corresponding memory page is acquired according to the memory page table entry acquired.

The corresponding memory page is acquired according to the memory page table entry acquired. In other words, the mapping relationship formed between the current virtual address and the memory page and recorded in the memory page table entry is acquired. Information of the memory page to which the traversed current virtual address is mapped is acquired according to the traversed current virtual address and the acquired mapping relationship between the traversed current virtual address and the memory page.

S115, the memory page acquired is taken as the first memory page in a case that the corresponding memory page is acquired and the memory page acquired has a compressibility identifier.

The corresponding memory page is acquired, which indicates that the corresponding memory page exists.

A compressible memory page can be set according to actual needs. In the embodiment, the memory page to which the virtual address of the discontinuous memory mapping space is mapped is configured with the compressibility identifier according to an access frequency and compression ratio of the memory data stored in the memory page. Specifically, In a case that the access frequency of the memory data is lower than a preset frequency threshold and the compression ratio of the memory data is greater than or equal to a preset compression ratio threshold, the corresponding memory page is configured with the compressibility identifier.

A form of the compressibility identifier can be selected according to actual needs. As an example, the compressibility identifier is PG_owner_priv_1. In other words, when having the identifier PG_owner_priv_1, the memory page is the compressible memory page.

S116, whether the virtual address interval of current scanning is traversed is determined, if yes, step S118 may be executed; and if not, step S117 may be executed.

S117, a next virtual address in the virtual address interval of current scanning is acquired as a current virtual address, and execution is re-activated from S113.

In the embodiment, the acquired next virtual address in the virtual address interval of current scanning indicates a virtual address next to the traversed current virtual address and acquired in sequence.

S118, the ultimate virtual address of current scanning is recorded, and current scanning is not ended until a next scanning cycle is reached.

When all the virtual address intervals of current scanning are traversed, the ultimate virtual address of current scanning is recorded. The ultimate virtual address of current scanning is recorded. Accordingly, a virtual address interval of next scanning is acquired according to the ultimate virtual address of current scanning in the next scanning cycle.

In the embodiment, information of the ultimate virtual address of current scanning is recorded by updating the last_vaddr field in the data structure of the discontinuous memory mapping space shrinker to the ultimate virtual address of current scanning.

It should be noted that time spacing between adjacent scanning cycles can be set according to actual needs, and is not limited herein.

With reference to FIG. 1 continuously, S120 that memory data in the first memory page are compressed, so as to obtain corresponding memory compressed data is executed.

The memory data in the first memory page are compressed, so as to obtain the corresponding memory compressed data, which is prepared for storing the corresponding memory compressed data in the data storage module preset subsequently.

A compression algorithm used to compress the memory data in the first memory page can be selected according to actual needs. As an example, the memory data in the first memory page are compressed through an LZ4 algorithm. The LZ4 algorithm features small space occupation and a high compression speed, and thus can improve compression efficiency of the memory data.

In the embodiment, the data structure of the discontinuous memory mapping space shrinker further includes: a tfm field configured to record information of the algorithm used for compression and decompression. With the tfm field in the data structure of the discontinuous memory mapping space shrinker, the information of the compression algorithm used to compress the memory data in the first memory page can be rapidly acquired, and the memory data in the first memory page can be rapidly compressed.

In the embodiment, the memory data in the first memory page are compressed in a preset cache, so as to obtain the corresponding memory compressed data.

Correspondingly, to conveniently acquire information of the preset cache configured to compress the memory data in the first memory page, the data structure of the discontinuous memory mapping space shrinker further includes: a buffer field configured to record the information of the preset cache used for compression. With the buffer field in the data structure of the discontinuous memory mapping space shrinker, the information of the preset cache configured to compress the memory data in the first memory page can be rapidly acquired, improving convenience of compressing the memory data in the first memory page.

With reference to FIG. 1 continuously, S130 that the memory compressed data are stored in a data storage module preset, where the data storage module is located in memory space outside the discontinuous memory mapping space is executed.

The memory compressed data are stored in the data storage module, where the data storage module is located in the memory space outside the discontinuous memory mapping space, which is prepared for releasing the first memory page subsequently.

The step that the memory compressed data are stored in a data storage module includes: a corresponding data storage position is allocated to the memory compressed data in the data storage module in a case that compression of the memory compressed data succeeds and a compression ratio satisfies a preset demand; and the memory compressed data are stored in the data storage position allocated in the data storage module.

In the embodiment, the data storage module is a zero-capacitor random access memory (ZRAM) module. The ZRAM module is an area allocated from the memory and stores the memory compressed data, increasing a processing speed of decompressing the memory compressed data back into the memory page during subsequent page fault processing.

Correspondingly, the corresponding data storage position is allocated to the memory compressed data in the data storage module. In other words, a ZRAM object is allocated to the memory compressed data.

In the embodiment, after the memory compressed data are stored in the data storage module, the memory management method further includes: a corresponding page mapping (kpage_map) data structure instance is generated for the memory compressed data, where the page mapping data structure instance includes the page fault address and information of the storage position of the memory compressed data in the data storage module; and the page mapping data structure instance generated is inserted into a management red-black tree with the page fault address as a key value.

The page fault address and the information of the storage position of the memory compressed data in the data storage module are stored in the management red-black tree, improving management efficiency of the page fault address and the information of the storage position of the memory compressed data in the data storage module.

Correspondingly, the page mapping (kpage_map) data structure instance includes: an addr field configured to record a virtual address of the corresponding first memory page; a handle field configured to record a handle corresponding to the ZRAM object storing the memory compressed data in the ZRAM module; and a node field configured to record a node, where the corresponding page mapping data structure instance is located, of the management red-black tree.

In the embodiment, to improve efficiency of page fault exception processing in subsequent page fault processing, the page mapping data structure instance further includes at least one of the following: a size field configured to record a size of the memory compressed data for subsequent decompression of the memory compressed data; an old_pte field configured to record a page table attribute of the first memory page before compression for subsequent re-construction of the page table; and a list field configured to record information of a double linked list, where during subsequent page fault exception processing, when the memory compressed data are decompressed into the memory page, to prevent the deadlock, the memory compressed data in the ZRAM module need to be released with delay. The double linked list is configured to link the ZRAM object to be released, and the list field and the node field belong to a union.

In the embodiment, to conveniently and rapidly acquire the ZRAM module and information of the corresponding management red-black tree during subsequent page fault exception processing, the data structure of the discontinuous memory mapping space shrinker further includes: a mem pool field configured to record a pointer to the ZRAM module; and a root field configured to record information of a root node of the management red-black tree.

Before the memory page to which the virtual address of the discontinuous memory mapping space is mapped is scanned, so as to obtain the compressible memory page as the first memory page, the memory management method further includes: first locking processing is performed on the management red-black tree.

First locking processing is performed on the management red-black tree, so that the management red-black tree is locked, avoiding competition for an operation of the management red-black tree, ensuring a smooth operation of inserting the page mapping data structure instance generated into the management red-black tree, and improving reliability of the operation of inserting the page mapping data structure instance generated into the management red-black tree.

With reference to FIG. 1 continuously, S140 that the first memory page is released after the memory compressed data are stored in the data storage module is executed.

The first memory page is released after the memory compressed data are stored in the data storage module. Thus, memory space consumption can be reduced, an effective memory capacity can be enhanced, and memory utilization can be improved correspondingly.

The step that the first memory page is released includes: unmapping processing is performed the virtual address of the discontinuous memory mapping space and the first memory page, so that the mapping relationship between the first memory page and the virtual address of the discontinuous memory mapping space is released; and the corresponding page table entry is cleared from the memory page table.

With reference to FIG. 1 continuously, S150 that the corresponding virtual address is set as a page fault address is executed.

After the memory compressed data are stored in the data storage module, a corresponding page fault identifier is configured for a virtual address corresponding to the first memory page in the discontinuous memory mapping space, and thus the virtual address corresponding to the first memory page in the discontinuous memory mapping space forms the page fault address.

With reference to FIG. 1 continuously, S160 that page fault exception processing is executed in a case that the page fault address is accessed is executed.

When the page fault address is accessed, the corresponding memory compressed data are acquired from the data storage module and decompressed into the memory page by executing page fault exception processing, which is specifically shown in FIG. 3.

FIG. 3 is a schematic flowchart of executing page fault exception processing in an embodiment of a memory management method according to the technical solution of the disclosure. With reference to FIG. 3, the step that page fault exception processing is executed includes:

S161, an idle memory page is acquired as a second memory page.

The idle memory page is acquired as the second memory page, which is prepared for decompressing the memory compressed data into the second memory page subsequently.

In the embodiment, before page fault exception processing is executed, the memory management method further includes: the idle memory page is pre-applied for; and information of the idle memory page applied for is stored.

In the embodiment, the idle memory page is pre-acquired, which indicates that part of the idle memory page is pre-applied for from a partner system responsible for memory management in a Linux system for subsequent page fault processing.

The information of the idle memory page pre-acquired is stored. Thus, the idle memory page can be acquired to store decompressed data obtained by decompressing the memory compressed data in subsequent page fault exception processing, improving reliability of a page fault exception processing operation. Moreover, the idle memory page configured to store decompressed memory compressed data can be rapidly acquired, so that efficiency of page fault exception processing can be improved.

In the embodiment, the information of the idle memory page pre-acquired is recorded by the data structure of the discontinuous memory mapping space shrinker. Specifically, the data structure of the discontinuous memory mapping space shrinker further includes: a pagejist field configured to record information of a linked list header of the idle memory page in a temporary preset cache.

Correspondingly, the step that an idle memory page is acquired as a second memory page includes: the idle memory page pre-applied for is acquired as the second memory page according to the information of the idle memory page pre-acquired.

In the embodiment, to avoid occupying the idle memory page, after the information of the idle memory page is acquired and stored, the memory management method further includes: locking processing is performed on the idle memory page acquired, so that the idle memory page acquired is locked.

Locking processing is performed on the idle memory page acquired, avoiding occupying the idle memory page pre-applied for by other modules or progresses. Accordingly, failure of page fault exception processing caused by occupation of the idle memory page pre-acquired can be avoided, and reliability of page fault exception processing can be improved correspondingly.

In the embodiment, information of a lock of the idle memory page pre-acquired is recorded by the data structure of the discontinuous memory mapping space shrinker. Specifically, the data structure of the discontinuous memory mapping space shrinker further includes: a pagejock field configured to record information of a lock protecting a linked list of the idle memory page in the temporary preset cache.

S162, the corresponding memory compressed data are acquired from the data storage module according to the page fault address.

In the embodiment, the step that the corresponding memory compressed data are acquired from the data storage module according to the page fault address includes: the corresponding page mapping data structure instance is acquired from the management red-black tree according to the page fault address; the information of the storage position of the memory compressed data in the data storage module is acquired from the page mapping data structure instance acquired in a case that the corresponding page mapping data structure instance is acquired; the memory compressed data are acquired from the data storage position acquired; and the corresponding page mapping data structure instance is released after the memory compressed data are acquired from the data storage position acquired.

As described above, after the memory compressed data are stored in the data storage module, the corresponding page mapping (kpage_map) data structure instance is generated for the memory compressed data, where the page mapping data structure instance includes the page fault address and the information of the storage position of the memory compressed data in the data storage module; and the page mapping data structure instance generated is inserted into the management red-black tree with the page fault address as the key value.

Correspondingly, when the corresponding memory compressed data are acquired from the data storage module according to the page fault address, a node, with the page fault address as the key value, of the management red-black tree is searched for in the management red-black tree, and the corresponding page mapping data structure instance is acquired from the found node of the management red-black tree. After the corresponding page mapping data structure instance is acquired, the information of the storage position of the memory compressed data in the data storage module is acquired from the page mapping data structure instance acquired. Thus, the corresponding memory compressed data are acquired from the corresponding storage position in the data storage module.

Specifically, the information of the storage position of the memory compressed data in the data storage module is acquired from the page mapping data structure instance acquired. In other words, the handle corresponding to the ZRAM object storing the memory compressed data in the ZRAM module is acquired from the handle field in the page mapping data structure instance acquired. The information of the storage position of the memory compressed data in the data storage module is determined through the handle acquired and corresponding to the ZRAM object storing the memory compressed data in the ZRAM module.

In the embodiment, the corresponding page mapping data structure instance is linked to a corresponding release linked list, the corresponding page mapping data structure instance is released with delay.

Correspondingly, the data structure of the discontinuous memory mapping space shrinker further includes: a km_free_list field configured to link the information of the linked list header of the page mapping data structure instance to be released.

S163, the memory compressed data acquired are decompressed into the second memory page.

The memory compressed data acquired are decompressed into the second memory page, so that the corresponding memory data can be accessed normally.

In the embodiment, the memory data stored in the first memory page are compressed through the LZ4 algorithm, so as to obtain the memory compressed data. Correspondingly, the memory compressed data are decompressed through a relevant decompression algorithm. The relevant decompression algorithm means a decompression algorithm capable of decompressing the memory compressed data compressed through the LZ4 algorithm.

In the embodiment, before the memory compressed data acquired are decompressed into the second memory page, the memory management method further includes: unlocking processing is performed on the idle memory page applied for, so that a lock of the idle memory page applied for is removed.

Unlocking processing is performed on the idle memory page applied for, so that the lock of the idle memory page applied for is released, which is prepared for decompressing the memory compressed data into the second memory page subsequently.

S164, mapping processing is performed on the second memory page and the page fault address after the memory compressed data are decompressed into the second memory page, so that the page fault address is mapped to the second memory page.

Mapping processing is performed on the second memory page and the page fault address, so that the page fault address is mapped to the second memory page. In other words, a corresponding page table entry is created in the memory page table, and the mapping relationship between the page fault address and the second memory page is recorded in the page table entry.

In the embodiment, before page fault exception processing is executed, the memory management method further includes: an interrupt request (IRQ) is closed.

Before page fault exception processing is executed, the interrupt request is closed. Accordingly, re-entry caused by interruption of a process of page fault exception processing can be avoided, and reliability of the page fault exception processing can be improved correspondingly.

In the embodiment, before the idle memory page is acquired as the second memory page, the step that page fault exception processing is executed further includes: a page table entry corresponding to the page fault address is searched for in the memory page table according to the page fault address; the page fault exception processing operation is ended in a case that the page table entry corresponding to the page fault address exists in the memory page table; and the step that an idle memory page is acquired as a second memory page is executed in a case that no page table entry corresponding to the page fault address exists in the corresponding memory page table.

In a case that the page table entry corresponding to the page fault address exists in the memory page table, it indicates that a process of page fault processing corresponding to the page fault address has been executed, and the corresponding memory compressed data have been decompressed into the page fault address. In this case, it is not required to perform corresponding page fault exception processing on the page fault address. On the contrary, in a case that no page table entry corresponding to the page fault address exists in the memory page table, it is required to continue performing the corresponding page fault exception processing operation on the page fault address. Thus, the corresponding memory compressed data can be decompressed into the idle memory page newly applied for, and the corresponding memory data can be accessed.

In the embodiment, in a case that no page table entry corresponding to the page fault address exists in the corresponding memory page table, the step that page fault exception processing is executed further includes: locking processing is performed on the memory page table, so as to lock the memory page table.

Locking processing is performed on the memory page table, so that the memory page table is locked. Accordingly, the memory page table can be prevented from being modified in the process of executing page fault exception processing, and a smooth operation of adding the corresponding page table entry in the memory page table can be ensured after the corresponding memory compressed data are subsequently decompressed into the idle memory page newly applied for.

In the embodiment, in a case that no page table entry corresponding to the page fault address exists in the corresponding memory page table, the step that page fault exception processing is executed further includes: second locking processing is performed on the management red-black tree, so that the management red-black tree is locked.

Second locking processing is performed on the management red-black tree, so that the management red-black tree is locked. Accordingly, competition for an operation of the management red-black tree can be avoided, and the corresponding page mapping data structure instance can be smoothly removed from the node of the management red-black tree after the corresponding memory compressed data are subsequently decompressed into the idle memory page newly applied for.

Correspondingly, the data structure of the discontinuous memory mapping space shrinker further includes: a treejock field configured to record information of a lock protecting the management red-black tree.

In the embodiment, in a case that no page table entry corresponding to the page fault address exists in the corresponding memory page table, the step that page fault exception processing is executed further includes: locking processing is performed on the corresponding page mapping data structure instance, so that the corresponding page mapping data structure instance is locked.

Locking processing is performed on the corresponding page mapping data structure instance, so that the corresponding page mapping data structure instance is locked. After the memory compressed data are acquired from the data storage position acquired, the corresponding page mapping data structure instance can be released with delay, and a delayed release operation of the corresponding page mapping data structure instance can be smoothly performed.

Correspondingly, the data structure of the discontinuous memory mapping space shrinker further includes: a freejock field configured to record information of a lock protecting the page mapping data structure instance to be released.

Correspondingly, a memory management module is further provided in the embodiments of the disclosure.

FIG. 4 is a schematic structural diagram of an embodiment of a memory management module according to the technical solution of the disclosure. With reference to FIG. 4, the memory management module 400 includes: a scanning component 410 configured to scan a memory page to which a virtual address of a discontinuous memory mapping space is mapped, so as to obtain a compressible memory page as a first memory page; a compression component 420 configured to compress memory data in the first memory page, so as to obtain corresponding memory compressed data; a storage component 430 configured to store the memory compressed data in a data storage module, where the data storage module is located in memory space outside the discontinuous memory mapping space; a memory page release component 440 configured to release the first memory page after the memory compressed data are stored in the data storage module; and a page fault address setting component 450 configured to set the corresponding virtual address as a page fault address.

In the embodiment, the memory management module 400 includes: a page fault exception processing component 460 configured to execute page fault exception processing in a case that the page fault address is accessed.

The memory management module is configured to execute the memory management method in the foregoing embodiment. The memory management method in the foregoing embodiment may alternatively be executed with other structures. Reference can be made to the corresponding description of the memory management method in the foregoing embodiment for the specific description of the memory management module in the embodiment, which will not be repeated herein.

Correspondingly, a chip is further provided in the embodiments of the disclosure. The memory management module is integrated into the chip. Reference can be made to the foregoing description for the memory management module, which will not be repeated herein.

Correspondingly, an electronic device is further provided in the embodiments of the disclosure. The electronic device includes at least one memory and at least one processor, where the memory stores one or more computer instructions, and the one or more computer instructions are executed by the processor, so as to implement the memory management method.

Figure 5:
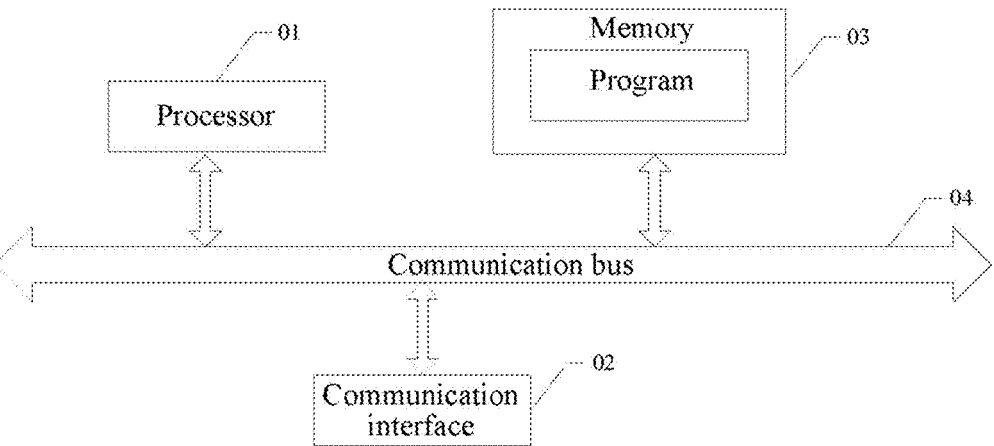
FIG. 5 is a structural diagram of hardware of a device according to an embodiment of the disclosure.

As shown in FIG. 5, an optional hardware structure of the electronic device according to the embodiment of the disclosure includes: at least one processor 01, at least one communication interface 02, at least one memory 03, and at least one communication bus 04.

In the embodiment of the disclosure, at least one processor 01, at least one communication interface 02, at least one memory 03, and at least one communication bus 04 are provided, and the processor 01, the communication interface 02, and the memory 03 communicate with one another through the communication bus 04.

The communication interface 02 may be an interface of a communication module configured to perform network communication, such as an interface of a global system for mobile communications (GSM) module.

The processor 01 may be a central processing unit (CPU), an application specific integrated circuit (ASIC), or one or more integrated circuits configured to implement the embodiments of the disclosure.

The memory 03 may include a high-speed random access memory (RAM), or may further include a non-volatile memory, for example, at least one magnetic disk storage.

The memory 03 stores one or more computer instructions, where the one or more computer instructions are executed by the processor 01, so as to implement the memory management method in the embodiment of the disclosure.

It should be noted that the above terminal device may further include other devices (not shown) that may be unnecessary for contents disclosed in the embodiment of the disclosure. These other devices may be unnecessary to understand the contents disclosed in the embodiment of the disclosure, and thus are not described in sequence in the embodiment of the disclosure.

A storage medium is further provided in the embodiments of the disclosure. The storage medium stores one or more computer instructions, where the one or more computer instructions are configured to implement the memory management method according to the embodiment of the disclosure.

The implementations of the disclosure described above are a combination of elements and features of the disclosure. The elements or features can be deemed selective unless mentioned otherwise. Each element or feature can be practiced without being combined with other elements or features. In addition, the implementations of the disclosure can be configured by combining some elements and/or features. The order of operations described in the implementations of the disclosure can be re-arranged. Some configurations of any implementation can be included in another implementation and replaced by corresponding configurations of another implementation. It is obvious to a person skilled in the art that claims that do not have a clear reference relationship with each other the appended claims can be combined into an implementation of the disclosure, or included as new claims in amendments after filing of the application.

The implementations of the disclosure can be implemented by various means such as hardware, firmware, software, or their combinations. In a hardware configuration mode, the method according to the illustrative implementation of the disclosure can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration mode, the implementations of the disclosure can be implemented in a form of modules, processes, functions, etc. Software codes can be stored in a memory component and executed by a processor. The memory component is located inside or outside the processor and can transmit data to and receive data from the processor by various known means.

The above descriptions of the disclosed embodiments enable a person skilled in the art to implement or use the disclosure. Various modifications to these embodiments are obvious to a person skilled in the art, and the general principles defined herein can be implemented in other embodiments without departing from the spirit or scope of the disclosure. Thus, the disclosure is not limited to these embodiments illustrated herein, but conforms to the broadest scope consistent with the principles and novel features disclosed herein.

Although disclosed above, the disclosure is not limited to the above descriptions. A person skilled in the art can make various changes and modifications without departing from the spirit and scope of the disclosure. Thus, the scope of protection of the disclosure should be subject to the scope defined by the claims.

What is claimed is:

1. A memory management method, comprising:
   scanning a memory page to which a virtual address of a discontinuous memory mapping space is mapped, so as to obtain a compressible memory page as a first memory page;
   compressing memory data in the first memory page, so as to obtain corresponding memory compressed data;
   storing the memory compressed data in a data storage module preset, wherein the data storage module is located in memory space outside the discontinuous memory mapping space;
   releasing the first memory page after the memory compressed data are stored in the data storage module; and
   setting the corresponding virtual address as a page fault address.

2. The memory management method according to claim 1, wherein the scanning a memory page to which a virtual address of a discontinuous memory mapping space is mapped, so as to obtain a compressible memory page as a first memory page comprises:
   acquiring a virtual address interval of current scanning from a current scanning cycle according to an ultimate virtual address of previous scanning;
   traversing the virtual address interval of current scanning, so as to obtain a traversed current virtual address;
   acquiring a corresponding memory page table entry from a memory page table according to the traversed current virtual address, wherein the memory page table entry comprises a mapping relationship between the virtual address and a memory page;
   acquiring the corresponding memory page according to the memory page table entry acquired;
   taking the memory page acquired as the first memory page in a case that the corresponding memory page is acquired and the memory page acquired has a compressibility identifier;
   acquiring a next virtual address as a current virtual address, and not re-executing steps from the step of acquiring a corresponding memory page table entry according to the traversed current virtual address until all virtual address intervals of current scanning are traversed; and recording an ultimate virtual address of current scanning, and not ending current scanning until a next scanning cycle is reached.

3. The memory management method according to claim 2, wherein the acquiring a virtual address interval of current scanning according to an ultimate virtual address of previous scanning comprises:

acquiring the ultimate virtual address of previous scanning;

acquiring a data structure instance of a virtual mapping area corresponding to current scanning according to the ultimate virtual address of previous scanning;

acquiring an initial virtual address of current scanning and information of a size of the virtual address interval from the data structure instance of the virtual mapping area corresponding to current scanning;

calculating the ultimate virtual address of current scanning according to the initial virtual address of current scanning and the information of the size of the virtual address interval that are acquired; and forming the virtual address interval of current scanning from the initial virtual address of current scanning to the ultimate virtual address of current scanning.

4. The memory management method according to claim 1, wherein the storing the memory compressed data in a data storage module comprises:

allocating a corresponding data storage position to the memory compressed data in the data storage module in a case that compression of the memory compressed data succeeds and a compression ratio satisfies a preset demand; and storing the memory compressed data in the data storage position allocated in the data storage module.

5. The memory management method according to claim 1, wherein after the corresponding virtual address is set as the page fault address, the method further comprises:

executing page fault exception processing in a case that the page fault address is accessed.

6. The memory management method according to claim 5, wherein the executing page fault exception processing comprises:

acquiring an idle memory page as a second memory page;

acquiring the corresponding memory compressed data from the data storage module according to the page fault address;

decompressing the memory compressed data acquired into the second memory page; and performing mapping processing on the second memory page and the page fault address, so that the page fault address is mapped to the second memory page.

7. The memory management method according to claim 6, wherein before page fault exception processing is executed, the method further comprises: pre-applying for the idle memory page; and storing information of the idle memory page applied for; and the acquiring an idle memory page as a second memory page comprises: acquiring the idle memory page applied for as the second memory page according to the stored information of the idle memory page.

8. The memory management method according to claim 7, wherein after the information of the idle memory page applied for is stored, the method further comprises: performing locking processing on the idle memory page applied for, so that the idle memory page applied for is locked; and before the memory compressed data acquired are decompressed into the second memory page, the method further comprises: performing unlocking processing on the idle memory page applied for, so that a lock of the idle memory page applied for is removed.

9. The memory management method according to claim 6, wherein after the memory compressed data are stored in the data storage module, the method further comprises: generating a corresponding page mapping data structure instance for the memory compressed data, wherein the page mapping data structure instance comprises the page fault address and information of the data storage position of the memory compressed data in the data storage module; and inserting the page mapping data structure instance generated into a management red-black tree with the page fault address as a key value; and the acquiring the corresponding memory compressed data from the data storage module according to the page fault address comprises: acquiring the corresponding page mapping data structure instance from the management red-black tree according to the page fault address; acquiring the information of the data storage position of the memory compressed data in the data storage module from the page mapping data structure instance acquired in a case that the corresponding page mapping data structure instance is acquired; acquiring the memory compressed data from the data storage position acquired; and releasing the corresponding page mapping data structure instance after the memory compressed data are acquired from the data storage position acquired.

10. The memory management method according to claim 1, wherein the data storage module is a zero-capacitor random access memory (ZRAM) module.

11. An electronic device, comprising:

at least one memory and at least one processor, wherein the memory stores one or more computer instructions that, when executed by the processor, cause the processor to implement a memory management method, the method comprising:

scanning a memory page to which a virtual address of a discontinuous memory mapping space is mapped, so as to obtain a compressible memory page as a first memory page;

compressing memory data in the first memory page, so as to obtain corresponding memory compressed data;

storing the memory compressed data in a data storage module preset, wherein the data storage module is located in memory space outside the discontinuous memory mapping space;

releasing the first memory page after the memory compressed data are stored in the data storage module; and setting the corresponding virtual address as a page fault address.

12. The electronic device according to claim 11, wherein the scanning a memory page to which a virtual address of a discontinuous memory mapping space is mapped, so as to obtain a compressible memory page as a first memory page comprises:

acquiring a virtual address interval of current scanning from a current scanning cycle according to an ultimate virtual address of previous scanning;

traversing the virtual address interval of current scanning, so as to obtain a traversed current virtual address;

acquiring a corresponding memory page table entry from a memory page table according to the traversed current virtual address, wherein the memory page table entry comprises a mapping relationship between the virtual address and a memory page;

acquiring the corresponding memory page according to the memory page table entry acquired;

taking the memory page acquired as the first memory page in a case that the corresponding memory page is acquired and the memory page acquired has a compressibility identifier;

acquiring a next virtual address as a current virtual address, and not re-executing steps from the step of acquiring a corresponding memory page table entry according to the traversed current virtual address until all virtual address intervals of current scanning are traversed; and recording an ultimate virtual address of current scanning, and not ending current scanning until a next scanning cycle is reached.

13. The electronic device according to claim 12, wherein the acquiring a virtual address interval of current scanning according to an ultimate virtual address of previous scanning comprises:

acquiring the ultimate virtual address of previous scanning;

acquiring a data structure instance of a virtual mapping area corresponding to current scanning according to the ultimate virtual address of previous scanning;

acquiring an initial virtual address of current scanning and information of a size of the virtual address interval from the data structure instance of the virtual mapping area corresponding to current scanning;

calculating the ultimate virtual address of current scanning according to the initial virtual address of current scanning and the information of the size of the virtual address interval that are acquired; and forming the virtual address interval of current scanning from the initial virtual address of current scanning to the ultimate virtual address of current scanning.

14. The electronic device according to claim 11, wherein the storing the memory compressed data in a data storage module comprises:

allocating a corresponding data storage position to the memory compressed data in the data storage module in a case that compression of the memory compressed data succeeds and a compression ratio satisfies a preset demand; and storing the memory compressed data in the data storage position allocated in the data storage module.

15. The electronic device according to claim 11, wherein after the corresponding virtual address is set as the page fault address, the method further comprises:

executing page fault exception processing in a case that the page fault address is accessed.

16. A non-transitory storage medium storing one or more computer instructions that, when executed by at least one processor, cause the at least one processor to implement a memory management method, the method comprising:

scanning a memory page to which a virtual address of a discontinuous memory mapping space is mapped, so as to obtain a compressible memory page as a first memory page;

compressing memory data in the first memory page, so as to obtain corresponding memory compressed data;

storing the memory compressed data in a data storage module preset, wherein the data storage module is located in memory space outside the discontinuous memory mapping space;

releasing the first memory page after the memory compressed data are stored in the data storage module; and setting the corresponding virtual address as a page fault address.

17. The non-transitory storage medium according to claim 16, wherein the scanning a memory page to which a virtual address of a discontinuous memory mapping space is mapped, so as to obtain a compressible memory page as a first memory page comprises:

acquiring a virtual address interval of current scanning from a current scanning cycle according to an ultimate virtual address of previous scanning;

traversing the virtual address interval of current scanning, so as to obtain a traversed current virtual address;

acquiring a corresponding memory page table entry from a memory page table according to the traversed current virtual address, wherein the memory page table entry comprises a mapping relationship between the virtual address and a memory page;

acquiring the corresponding memory page according to the memory page table entry acquired;

taking the memory page acquired as the first memory page in a case that the corresponding memory page is acquired and the memory page acquired has a compressibility identifier;

acquiring a next virtual address as a current virtual address, and not re-executing steps from the step of acquiring a corresponding memory page table entry according to the traversed current virtual address until all virtual address intervals of current scanning are traversed; and recording an ultimate virtual address of current scanning, and not ending current scanning until a next scanning cycle is reached.

18. The non-transitory storage medium according to claim 17, wherein the acquiring a virtual address interval of current scanning according to an ultimate virtual address of previous scanning comprises:

acquiring the ultimate virtual address of previous scanning;

acquiring a data structure instance of a virtual mapping area corresponding to current scanning according to the ultimate virtual address of previous scanning;

acquiring an initial virtual address of current scanning and information of a size of the virtual address interval from the data structure instance of the virtual mapping area corresponding to current scanning;

calculating the ultimate virtual address of current scanning according to the initial virtual address of current scanning and the information of the size of the virtual address interval that are acquired; and forming the virtual address interval of current scanning from the initial virtual address of current scanning to the ultimate virtual address of current scanning.

19. The non-transitory storage medium according to claim 16, wherein the storing the memory compressed data in a data storage module comprises:

allocating a corresponding data storage position to the memory compressed data in the data storage module in a case that compression of the memory compressed data succeeds and a compression ratio satisfies a preset demand; and storing the memory compressed data in the data storage position allocated in the data storage module.

20. The non-transitory storage medium according to claim 16, wherein after the corresponding virtual address is set as the page fault address, the method further comprises:

executing page fault exception processing in a case that
   the page fault address is accessed.

* * * * *